United States Patent Office 3,053,909
Patented Sept. 11, 1962

3,053,909
AROMATICALLY UNSATURATED ORGANIC COMPOUNDS AND PREPARATION THEREOF
Horace R. Davis, Cedar Grove, Louis A. Errede, Westfield, and Billy F. Landrum, Cedar Grove, N.J., assignors, by mesne assignments, to Minnesota Mining and Manufacturing Company, St. Paul, Minn., a corporation of Delaware
No Drawing. Filed Feb. 10, 1956, Ser. No. 564,619
8 Claims. (Cl. 260—651)

This invention relates to aromatically unsaturated organic compounds, and to a novel and improved process for the preparation thereof. In one aspect the invention relates to a novel process for the preparation of organic compounds containing an aromatic nucleus to which are bonded at least two aliphatic groups. Another aspect of the invention relates to new and useful aromatic compounds. In still another aspect this invention relates to a novel and improved process for the preparation of xylylene halides, xylylene pseudo-halides, xylyl halides and other xylylene and xylyl derivatives.

A valuable class of aromatic compounds having wide commercial application are the organic compounds which contain one or more aromatic nuclei having at least two aliphatic substituents bonded to nuclear carbon atoms which are in the 1 and 4 position to each other. Illustrative of such compounds are the xylylene and xylyl derivatives such as, for example, p-xylylene dichloride, p-xylylene dibromide, p-xylylene dicyanide and p-xylyl chloride.

It is known that p-xylylene dichloride, an important insecticide, is obtained by the chlorination of p-xylene; and that p-xylylene dibromide, an important chemical intermediate or a cytotoxic agent with tumor inhibitory activity, is produced by the bromination of p-xylene. These preparations, however, result in a mixture of products which are difficult to separate and purify. For example, in the chlorination of p-xylene, the main products of the reaction are α,α-dichloro-p-xylene, α,α,α',α'-tetrachloro-p-xylene and terephthalaldehyde. Another xylylene derivative, namely, p-xylylene dicyanide is also difficult to prepare but has been found to be useful as a strating material in the syntheisis of phenylene diacetic acid, a polymerizable compound.

Similarly, xylyl derivatives such as p-xylyl chloride are also valuable as chemical intermediates but to-date extensive commercial use of such compounds has been limited due to their lack of availability. An improved process for the production of p-xylyl chloride is highly desirable since this compound can be oxidized by potassium permanganate to yield the valuable terephthalic acid.

It is an object of the present invention to provide an improved method for the preparation of certain organic compounds.

Another object of this invention is to provide an improved method for the production of nonhalogenated aromatic compounds having at least two aliphatic substituents bonded to nuclear carbon atoms which are in the 1 and 4 position to each other.

Another object if this invention is to provide an improved method for the production of halogen-containing aromatic compounds having at least two aliphatic substituents bonded to nuclear carbon atoms which are in the 1 and 4 position to each other.

Another object of this invention is to provide a novel process for the manufacture of xylylene halides, xylylene pseudo-halides, xylyl halides and other xylyl and xylylene derivatives, which process is commercially feasible and economical.

Another object is to provide a direct method for the manufacture of xylylene halides, xylylene pseudo-halides, xylyl halides and other xylyl and xylylene derivatives in good yield and high selectivity.

Another object is to provide a method of manufacture for the above-mentioned compounds which is characterized by the minimum formation of by-products and the maximum utilization of starting materials.

A still further object is to provide novel aromatically unsaturated organic compounds which are valuable as chemical intermediates.

Other objects and advantages of the present invention will become apparent to those skilled in the art from the accompanying description and disclosure.

These objects are accomplished by the novel process which comprises reacting a quinodimethane with an inorganic dissociable compound selected from the group consisting of the halogens, pseudo-halogens, and inorganic acids. The preferred quinodimethanes used in accordance with this invention are those of the group consisting of p-quinodimethane, p-naphthaquinodimethane, and corresponding heterocyclic quinodimethanes containing at least one heteronitrogen atom vicinal only to carbon atoms, and the nuclear substitution products of the foregoing members with atoms of the normally gaseous halogens and methyl groups. The process of this invention is preferably conducted by interacting at least equimolar amounts of the quinodimethane and the inorganic dissociable co-reactant in a mutual solvent at temperature below about −45° C., although reaction temperatures as high as 100° C. also may be employed without departing from the scope of this invention. Generally speaking, the products thereby obtained are aromatically unsaturated compounds resulting from the addition of the inorganic dissociable reactant to the quinodimethane and are, therefore, aromatic compounds containing atoms of halogens, pseudo-halogens, and inorganic acid groups.

The quinodimethanes used in accordance with the present invention contain from 1 to 2 six-membered rings, one of said rings being diunsaturated and having each of two carbon atoms of the ring bonded to a carbon atom of an aliphatic group through a double bond. The latter type ring which is common to each of the quinodimethanes used in the process of this invention is referred to herein as the quinoid ring. Although the two aliphatic groups which are doubly bonded to the diunsaturated or quinoid ring may be bonded to adjacent, i.e. ortho-positioned, carbon atoms of the ring, they are preferably bonded to carbon atoms of the ring which are in the para or 1,4 position to one another. The preferred quinodimethanes of this invention are those having a symmetrically diunsaturated six-membered ring to which a methylene group is doubly bonded to each of the two para-positioned carbon atoms, such as, for example, in p-quinodimethane which has the structure,

(1)

As indicated above, the term quinodimethane as used herein also includes those compounds having more than the one quinoid ring. The quinodimethanes which contain more than the one quinoid type ring are preferably those in which the additional ring is a six-membered ring having aromatic unsaturation of the benzenoid or resonating type, and which is fused to the quinoid ring such as, for example, in 1,4-naphthaquinodimethane which has the structure:

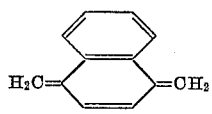
(2)

The aromatically unsaturated ring which is fused to the quinoid ring is referred to herein as the benzenoid ring.

It is to be understood that the quinodimethane starting material of this invention may be a carbocyclic compound, i.e. a compound in which each atom of the basic ring structure is a carbon atom such as in p-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and includes those in which nitrogen is a constituent of the quinoid ring or the benzenoid ring.

The groups which are singly bonded to the cyclic skeleton of the quinodimethanes are referred to herein as the nuclear substituents and are of the group consisting of hydrogen, normally gaseous halogens and methyl groups. These substituents of the dicyclic compounds may be on the quinoid ring or on the aromatically unsaturated ring or on both rings. Where more than one halogen is present, they may be either the same halogens or different halogens. Of the quinodimethanes which are substituted with methyl or halogen groups, those having not more than two methyl groups or halogens are preferred.

The preferred quinodimethane starting material which is reacted in accordance with the present invention is prepared by pyrolyzing an aromatic compound of the group consisting of p-xylene, 1,4-dimethyl naphthalene, corresponding heterocyclic dimethyl compounds having from 1 to 2 six-membered rings and containing at least one heteronitrogen which is vicinal only to carbon atoms, and the nuclear substitution products of the foregoing members with atoms of the normally gaseous halogens and additional methyl groups, at a temperature between about 700° C. and 1300° C. and a total pressure not higher than about 400 mm. mercury for a period of not more than one second followed by quenching of the pyrolyzed vapors in a cold liquid to a temperature which is preferably below about —45° C.

Among the specific carbocyclic aromatic compounds which can be pyrolyzed to produce the quinodimethanes which are used as a reactant in accordance with the process of this invention are: p-xylene; pseudocumene; durene; isodurene; prehnitene; pentamethyl benzene; hexamethyl benzene; 1,4-dimethyl naphthalene; 1,2,3,4,6,7-hexamethyl naphthalene; 2-chloro-p-xylene; 2-fluoro-p-xylene; 2,5-difluoro-p-xylene; 2,5-dichloro-p-xylene; 2,3,5-trichloro-p-xylene; 2,3,5-trifluoro-p-xylene; 2,3,5,6-tetrachloro-p-xylene; 2,3,5,6-tetrafluoro-p-xylene; 2-chloro-3,5,6-trimethyl benzene; 6-chloro-1,4-dimethyl naphthalene; and 2,3,6,7-tetrachloro-1,4-dimethyl naphthalene.

Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloro-pyrazine.

The pyrolysis of the aforesaid dimethyl substituted aromatic compounds such as p-xylene, is preferably carried out at a temperature within the range of about 950° C., to about 1300° C. For best results the aromatic vapor should be present at a partial pressure substantially not higher than 150 mm. mercury. Excellent results are obtained when the partial pressure of the 1,4-dimethyl substituted aromatic compound is 10 mm. mercury or somewhat below. The pyrolysis can be conducted in the presence of an inert gas, such as carbon dioxide, steam or nitrogen, particularly when the partial pressure of the aromatic compound is 10 mm. mercury or somewhat below. In all cases the total pressure employed should be below 400 mm. mercury. Within the preferred pyrolysis temperature range the contact time should be within the range of from about 0.1 to about 0.001 second.

The hot vapor of quinodimethane produced by the above pyrolysis reaction is rapidly quenched in a liquid maintained at a relatively low temperature which is preferably below —45° C. The temperature at which the hot vapors of quinodimethane are quenched depends on whether or not the quinodimethane is to be stored over an extended period of time or whether the quinodimethane is to be used immediately in accordance with the process of this invention. This is an important consideration since it has been found that the quinodimethanes form polymeric products at about room temperature, and in fact, they polymerize rapidly at temperatures above about —45° C. Thus, when it is desired to store the quinodimethane in stable form until it is to be interacted with the inorganic coreactants of the present invention, the hot vapor obtained by the above pyrolysis reaction is quickly quenched in a cold liquid maintained at a temperature below about —45° C. and preferably at about —80° C.

The liquid used for quenching and storing of the quinodimethane may be of any composition which remains liquid at the necessary temperature range and which has a relatively low partial pressure at about —45° C. consistent with the upper total pressure limit of 400 mm. mercury pressure and preferably low enough to permit operation below 10 mm. mercury. The liquid should also be substantially non-reactive with the quinodimethanes formed, although liquids which react to some slight degree with the compounds may be used. Among the specific liquids which may be used are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloroethyl benzene, o-fluoro toluene and 1,1-dichloroethane; carbonyl compounds of low freezing point such as acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. It is to be understood that any mixture of the aforesaid liquids may be used as the quenching medium, as desired. If desired, liquids of low freezing point may be obtained by the blending of two or more compounds of higher freezing point. For example, mixtures of carbon tetrachloride and chloroform may be used.

A more detailed description concerning the preparation of stable concentrated solutions of the quinodimethanes used in accordance with the present invention can be found in our prior copending application, Serial Number 386,106, filed October 14, 1953, now U.S. Patent No. 2,777,005.

As above stated the inorganic dissociable compound which is reacted with the quinodimethanes in accordance with the present invention is selected from the group consisting of the halogens, pseudo-halogens, and inorganic acids.

The halogens which are employed in the process of this invention include the elemental halogens, namely, molecular fluorine, chlorine, bromine, and iodine, and any mixture thereof. Included within the scope of this invention is the use of compounds which are capable of yielding halogen atoms in situ such as, for example, chlorine fluoride, chlorine trifluoride, bromine trifluoride, iodine trichloride, and the like.

Suitable pseudo-halogens which are employed in accordance with this invention are cyanogen, thiocyanogen, cyanogen fluoride, cyanogen chloride, cyanogen bromide, cyanogen iodide, cyanogen oxide, and any mixture thereof. The term "pseudo-halide" is a standard term used in the literature (for example, refer to the textbook entitled "Inorganic Chemistry," by Fritz Ephraim, fifth edition, page 173), and is used to describe those compounds which yield free radicals resembling the halogens in reaction and reactivity.

The inorganic acids which are used as a co-reactant in accordance with the process of this invention are the hydrogen-containing strong and weak acids. Typical examples of the strong acids are those consisting of hydrogen and halogen such as hydrogen fluoride (HF), hydrogen chloride (HCl), hydrogen bromide (HBr) and hydrogen iodide (HI); and acids consisting of hydrogen, oxygen, and an atom of sulfur, phosphorus, or nitrogen such as sulfuric acid, phosphoric acid, and nitric acid, respectively. Typical examples of the weak acids which are employed are the nitrogen-containing acids such as hydrogen cyanide (HCN) and cyanic acid (HCNO); and the acids consisting of hydrogen, oxygen, and halogen such as hypochlorous acid (HOCl), and hypobromous acid (HOBr).

The inorganic coreactants of this invention may be represented by the formula, A—B, wherein A is a member of the group consisting of a halogen atom (i.e. F, Cl, Br, I) a hydrogen atom, and cyano (CN), thiocyano (SCN), and cyanate (CNO) radicals, and wherein B is a member of the group consisting of a halogen atom and cyano, thiocyano, cyanate, hydrosulfate ($HSO_4$), dihydrophosphate ($H_2PO_4$), and hydroxy (OH) radicals. Such compounds are capable of splitting or dissociating into two reactive moieties, namely A and B, which may be either free radicals (e.g. in the case of the halogens and pseudo halogens) or ions (e.g. in the case of the inorganic acids.

Generally speaking, the products produced in accordance with the present invention are 1:1 addition products of the quinodimethane and the inorganic coreactant and result from the addition of the inorganic reactive moieties, namely, A and B, to each of the doubly bonded methylene groups of the quinoid ring thereby causing rearrangement of the di-unsaturated quinoid ring to an aromatically unsaturated ring. The following equations are offered as a better understanding of this invention and are not to be construed as unnecessarily limiting thereto and illustrate the reaction of p-quinodimethane with chlorine, fluorine, cyanogen, hydrogen chloride, and hypochlorous acid, respectively, under the conditions described herein to yield the corresponding p-xylylene or p-xylyl derivatives.

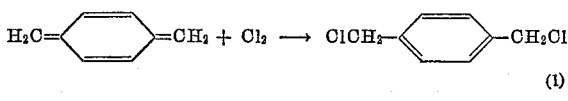
(1)

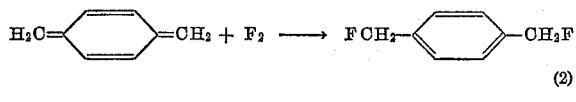
(2)

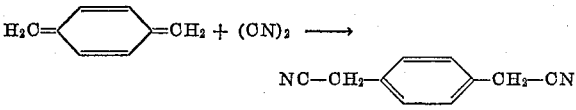
(3)

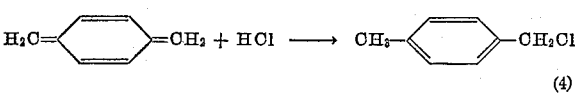
(4)

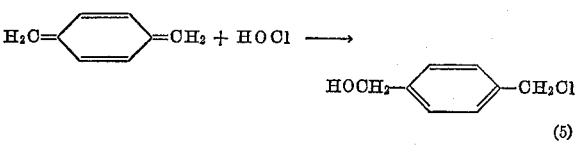
(5)

Thus the following equation may be used to represent the general reaction of the present invention wherein p-quinodimethane is used as a typical example of the various quinodimethanes which may be employed.

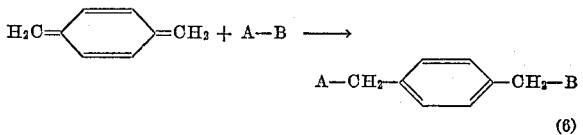
(6)

It is apparent from the above equations that the xylyl derivatives (e.g. as shown in Equation 4 above) are produced as the product of the process only when A is a hydrogen atom such as when the dissociable coreactant is a hydrogen halide, sulfuric acid, phosphoric acid, hydrogen cyanide, thiocyanic acid, and cyanic acid.

In carrying out the process of this invention the quinodimethane and inorganic coreactant are employed in at least equimolar amounts in order to obtain the optimum yield of the 1:1 addition product. Although the mole ratio of quinodimethane to dissociable reactant may vary between about 1:1 and about 1:100, it is preferred to employ the starting materials in a mol ratio of between about 1:1.5 and about 1:5 of quinodimethane to inorganic coreactant.

The presently described process may be carried out in the presence or absence of a catalyst. The preferred catalysts for the presently described process are the halogens and acid type catalysts. Although sulfuric acid, for example, is a coreactant, it may be used in catalytic amounts (e.g. in amounts of between about 0.001 and about 0.1 mol per mol of quinodimethane) to promote the reaction between the quinodimethane and one of the other dissociable compounds. In like manner, catalytic amounts of fluorine may be used to catalyze the reaction between the quinodimethane and chlorine.

Although the process of the present invention may be carried out at a temperature as high as 100° C., it is usually carried out at a temperature below about 30° C., and preferably at a temperature below about —45° C. which temperature may be as low as —120° C. The particularly preferred reaction temperature ranges between about —60° C. and about —100° C. When the reaction between the quinodimethane and inorganic coreactant is carried out at a temperature about —45° C., it is important that the quinodimethane be brought to such a temperature while in contact with at least an equimolar amount of the inorganic coreactant in order to keep the competing homopolymerization of the quinodimethane at a minimum. Thus, for example, when p-xylene is pyrolyzed under the conditions set-forth above, and the hot vapors are quenched quickly in a cold liquid to a temperature between about —45° C. and about 30° C. to produce p-quinodimethane, the quenching step and reaction with at least an equimolar amount of the inorganic coreactant are carried out substantially simultaneously. It is to be noted that temperatures as high as 100° C. are generally employed only when iodine is used as the inorganic coreactant.

The addition reactions of the present invention preferably are carried out by contacting the quinodimethane and the inorganic coreactant such as chlorine, for example, in a suitable liquid medium within the aforesaid temperature range. The liquid which is used as the reaction medium may be any one of the aforesaid liquids of low freezing point which are suitable as the liquid in which the quinodimethanes are quenched and stored. Generally speaking, the above-mentioned liquids of low freezing point which are used as solvents for the quinodimethane are also suitable solvents for the inorganic coreactant. The addition reactions of this invention are preferably carried out in the liquid phase since a vapor phase reaction is accompanied by various undesirable side reactions which may deleteriously affect the yield of desired 1:1 addition product.

In carrying out the process of this invention, it is important that the initial concentration of the inorganic coreactant be relatively high as compared with the concentration of the quinodimethane in order to obtain the maximum yield of the desired 1:1 addition product and to keep the competing homopolymerization reaction of the quinodimethane at a minimum. As indicated above, this is particularly important when the quinodimethane and inorganic coreactant are initially contacted at a temperature between about −45° C. and 30° C. The order of addition of reactants to the reaction zone is an important factor which also influences the yield of desired product and selectivity of the process. It has been found that the highest yields of desired product are obtained by the gradual addition of the solution of quinodimethane to an excess of the inorganic coreactant while agitating the reaction mixture in order to promote better contact between the two reactants and to prevent the buildup of a high concentration of quinodimethane at the site of addition. In instances where the inorganic coreactant is a liquid at the reaction temperature and soluble in the quinodimethane solution the solution of quinodimethane may be added to undiluted coreactant. Thus, for example, the solution of quinodimethane may be added at a temperature below about −45° C. to 100 percent liquid chlorine (melting point −106° C., boiling point −34.6° C.) to yield the desired dichloride derivative. However, it is preferable to add the solution of quinodimethane to a solution of the inorganic coreactant.

Thus, in a preferred embodiment of this invention a solution of p-quinodimethane, for example, which is chilled to a temperature between about −120° C. and about −45° C. is added to a solution containing the inorganic coreactant, the coreactant being present in a molar concentration which is at least equal to the number of mols of quinodimethane which is to be added. The products of the reaction begin to form immediately and the reaction may be allowed to run to completion at temperatures of −45° C. or below, or the reaction mixture may be gradually warmed to a higher temperature such as 30° C., as desired. It is possible under these conditions to obtain almost quantitative yields of product based on the amount of quinodimethane initially added to the reaction zone. Upon completion of the reaction which is generally accomplished within one-half hour to 24 hours, the excess inorganic coreactant, if sufficiently volatile, is conveniently removed by bubbling an inert gas such as nitrogen, through the system, or in the case of less volatile coreactants, the reaction mixture is concentrated by removing the solvent and any unreacted material by evaporation. The products are purified by conventional techniques such as crystallization or fractional distillation depending upon the physical nature of the products.

The following examples are offered as a better understanding of the present invention and are not to be construed as unnecessarily limiting thereto.

*Example 1*

This example illustrates the preparation of p-quinodimethane.

p-Xylene vapor, at 5 mm. Hg pressure and preheated to 700° C., is led through a pyrolysis tube of 2.5 cm. diameter and 30 cm. in length at such a velocity that the average contact time is 0.05 second and heated to a pyrolysis temperature of 1000° C. The pyrolyzed vapors are passed directly to the top of a 6 liter 3-necked flask containing 3.8 liters of a chloroform-carbon tetrachloride mixture (1 to 1 by volume) which is cooled in a bath of Dry Ice-acetone to a temperature of minus 80° C. The chloroform-carbon tetrachloride mixture is continuously agitated to prevent localized heating. A deposit of polymer is rapidly formed on the uncooled upper surface of the flask and on the upper portion of the agitator. The liquid itself remains transparent for about two hours until the saturation limit is reached and then becomes opaque as solid p-xylene precipitates out. The flask is disconnected from the train at the end of the run and the solid precipitate containing p-xylene is removed by filtration. The mother liquor contains dissolved p-quinodimethane and is stored as such at a temperature of −80° C. When a portion of this solution is allowed to warm to room temperature, insoluble poly-p-xylylene polymer is deposited.

Solutions of p-quinodimethane in acetone, xylene, toluene, and in any of the aforesaid liquids of low freezing point suitable for quenching of the pyrolyzed vapor are similarly prepared as described above.

*Example 2*

This example illustrates the preparation of 2-methyl-p-quinodimethane.

Pseudocumene vapor, at 5 mm. Hg pressure and preheated to 600° C., is led through the pyrolysis tube of Example 1 at such a velocity that the average contact time is 0.08 second and heated to a pyrolysis temperature of 900° C. The pyrolyzed vapors are passed directly to the top of the condenser flask of Example 1, containing 3.8 liters of acetone which is cooled in a bath of Dry Ice-acetone to a temperature of minus 60° C. The acetone in the condenser flask is continuously agitated to prevent localized heating. A deposit of polymer is rapidly formed on the uncooled upper surface of the flask and on the upper portion of the agitator. The liquid itself remains transparent for about two hours until the saturation limit is reached and then becomes opaque as solid pseudocumene precipitates out of solution, the precipitate being removed by filtration. The mother liquor contains dissolved 2-methyl-p-quinodimethane and is stored, as such, at a temperature which is preferably −80° C. or below. When a portion of this solution is allowed to warm to room temperature, an insoluble polymer is deposited.

*Example 3*

This example illustrates the preparation of 1,4-naphthaquinodimethane.

1,4-dimethyl naphthalene vapor, at 4 mm. Hg pressure and preheated to 600° C., is led through the pyrolysis tube of Example 1 at such a velocity that the average contact time is 0.04 second and heated to a pyrolysis temperature of 975° C. The pyrolysis vapors are passed directly to the top of the condenser flask of Example 1, containing 3.8 liters of hexane which is cooled in a bath of Dry Ice-acetone to a temperature of minus 60° C. The hexane solution is continuously agitated to prevent localized heating. A deposit of polymer is rapidly formed on the uncooled upper surface of the flask and on the upper portion of the agitator. The liquid itself remains transparent for about 2½ hours until the saturation limit is reached and then becomes opaque as solid 1,4-dimethyl naphthalene precipitates out of solution, which precipitate is removed by filtration. The mother liquor contains dissolved 1,4-naphthaquinodimethane and is stored, as such, at a temperature which is preferably below −60° C. When a portion of this solution is allowed to warm to room temperature, an insoluble polymer is deposited.

*Example 4*

This example illustrates the preparation of 2-fluoro-p-quinodimethane.

2-fluoro-p-xylene, at 6 mm. Hg pressure and preheated to 500° C., is led through the pyrolysis tube of Example 1 at such a velocity that the average contact time is 0.06 second and heated to a pyrolysis temperature of 950° C. The pyrolyzed vapors are passed directly to the top of the condenser flask of Example 1, containing 3.8 liters of toluene which is cooled in a bath of Dry Ice-acetone to a temperature of minus 80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation limit is reached and then becomes opaque as solid 2-fluoro-p-xylene precipitates out of solution, which precipitate is removed by filtration. The mother liquor contains 2-fluoro-p-quinodimethane which is preferably stored at a temperature of −80° C. When a portion of the mother liquor is allowed to warm to room temperature, an insoluble solid polymer is deposited.

*Example 5*

This example illustrates the preparation of 2-chloro-p-quinodimethane.

2-chloro-p-xylene at 2.3 mm. mercury pressure and preheated to 500° C. is led through the pyrolysis tube of Example 1 at such a velocity that the average contact time is 0.006 second and heated to a pyrolysis temperature of 1050° C. The pyrolyzed vapors are passed directly to the top of the condenser flask of Example 1 containing 3.8 liters of toluene which is cooled in a bath of Dry Ice-acetone to a temperature of −80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation point is reached and then becomes opaque as solid 2-chloro-p-xylene precipitates out of solution, which precipitate is removed by filtration of the solution. The mother liquor contains dissolved 2-chloro-p-quinodimethane and is maintained at a temperature of about −80° C. until it is to be used. When a portion of the mother liquor is allowed to warm to room temperature, an insoluble polymer is deposited.

*Example 6*

This example illustrates the preparation of p-xylylene dichloride from p-quinodimethane.

Approximately 2.75 liters of xylene containing 0.11 mol of dissolved p-quinodimethane prepared in accordance with Example 1 above, were added to a 5 liter 3-necked glass flask which was cooled in a bath of Dry Ice-acetone to a temperature of −80° C. There were then added 23 cc. of liquid chlorine while maintaining the reaction mixture at a temperature of −80° C. The solution was vigorously agitated at this temperature in the absence of light for a period of 30 minutes, after which time the excess chlorine was removed by bubbling a stream of nitrogen through the solution. The solution was subsequently evaporated to dryness under vacuum. The solid residue was then extracted with hot xylene to yield 9.5 grams (50 percent yield) of p-xylylene dichloride having a melting point of 90–93° C. Sublimation and subsequent recrystallization produced pearl white platelets melting at 95°–97° C. The melting point agrees with that reported in the literature for p-xylylene dichloride.

*Example 7*

This example illustrates the preparation of p-xylylene dibromide.

A solution of 320 grams of bromine dissolved in 300 cc. of carbon disulfide and cooled to a temperature of −80° C. was added slowly to a solution of p-quinodimethane dissolved in a 1:1 chloroform-carbon tetrachloride solution at −80° C. The resultant solution was allowed to warm to room temperature (about 22° C.) for a period of about one hour while continuously agitating the reaction mixture. The small amount of solid polymeric material which formed upon warming the solution to room temperature was removed by filtration. The mother liquor was evaporated to dryness under vacuum leaving a solid residue which was decolorized with charcoal and recrystallized from xylene. The product of this reaction was in the form of white needles and was identified as p-xylylene dibromide, melting at 137°–140° C. When a sample of this product was admixed with a sample of p-xylylene dibromide obtained by another procedure, there was no observed lowering of the melting point. The product of this example was obtained in a 55 percent yield.

*Example 8*

This example illustrates the preparation of p-xylylene diiodide from p-quinodimethane.

The concentrated chloroform-carbon tetrachloride solution (1 liter) of p-quinodimethane produced in accordance with Example 1 above was gradually added to a chloroform-carbon tetrachloride solution containing an excess of iodine. The reaction mixture was maintained at a temperature of −80° C. until the solution of p-quinodimethane was completely added. The mixture was then allowed to warm to room temperature with agitation. The excess or unreacted iodine was neutralized with aqueous sodium thiosulfate and the organic layer was washed with water to remove all traces of inorganic solids. The chloroform and carbon tetrachloride were removed under vacuum and the dry residue was recrystallized from methanol to yield crystalline material having a melting point of 176°–177° C. and containing 70.9 percent iodine. The product is identified as p-xylylene diiodide (literature melting point=177°–178° C.).

*Example 9*

This example illustrates the preparation of 2-chloro-p-xylylene diiodide from 2-chloro-p-quinodimethane.

A carbon tetrachloride-chloroform solution of 2-chloro-p-quinodimethane produced in accordance with Example 5 above was added to a carbon-tetrachloride-chloroform solution containing an excess of iodine. The reaction mixture was maintained at a temperature of −80° C. until the solution of 2-chloro-p-quinodimethane was completely added. The mixture was then allowed to warm to room temperature. The excess or unreacted iodine which remained was neutralized with aqueous sodium thiosulfate and the organic liquid was washed with water to remove all traces of inorganic salts. The chloroform and carbon tetrachloride were removed by evaporation and the dry residue was taken up in hot hexane. The solid material obtained on cooling was recrystallized with methanol and subsequently purified further by sublimation to yield a product melting at 146.5°–147° C. and identified as 2-chloro-p-xylylene diiodide which was obtained in 65 percent yield. This product was analyzed and found to have the following composition and molecular weight.

| | Percent C | Percent H | Percent I | Percent Cl |
| --- | --- | --- | --- | --- |
| Theoretical for $C_8H_7ClI_2$ | 24.4 | 1.80 | 64.6 | 9.05 |
| | Molecular Weight=392.5 | | | |
| Found | 24.86, 24.54 | 1.70, 1.84 | 64.40 | 8.74 |
| | Molecular Weight=385 | | | |

*Example 10*

This example illustrates the preparation of 2-methyl-p-xylylene diiodide from 2-methyl-p-quinodimethane.

A toluene solution of 2-methyl-p-quinodimethane at −80° C. and prepared as described in Example 2 above was added to a toluene solution containing an excess of iodine. The reaction mixture was maintained at a temperature of −80° C. until the solution of 2-methyl-p-quinodimethane was completely added. The mixture was then allowed to warm to room temperature with agitation. The unreacted iodine was neutralized with an aqueous solution of sodium thiosulfate and the organic liquid was washed with water to remove all traces of inorganic salts. The toluene layer was then evaporated to dryness and the dark residue extracted with hot hexane. The solid material obtained on cooling of the hexane solution was purified by sublimation and a final recrystallization from hexane produced light lemon yellow needles melting at 152.0°–155° C., which were identified as 2-methyl-p-xylylene diiodide which was obtained in a 60 percent yield. This product, upon analysis, was found to have the following composition and molecular weight.

|  | Percent C | Percent H | Percent I |
|---|---|---|---|
| Theoretical for $C_9H_{10}I_2$ | 29.1 | 2.69 | 68.2 |
|  | Molecular Weight=371.9 | | |
| Observed | 28.84, 29.02 | 2.65, 2.55 | 68.25 |
|  | Molecular Weight=345 | | |

*Example 11*

This example illustrates the preparation of p-xylyl chloride from p-quinodimethane.

A solution of p-quinodimethane monomer in hexane at −80° C. was added to an ether solution which was saturated with hydrogen chloride, the ether solution also having been cooled to −80° C. The reaction was carried out in a glass flask and the reaction mixture was gently agitated while maintaining the reaction temperature at −80° C. The reaction mixture was allowed to stand overnight (about 16 hours) at a temperature of −40° C. The small amount of insoluble polymeric material which formed was removed by filtration and the mother liquor was evaporated to dryness. The dark non-volatile oil, upon analysis was found to contain 10.01% chlorine. Identification of the product as p-xylyl chloride was made by converting the product of p-xylyl cyanide and subsequent hydrolysis of the latter compound to the known p-tolyl acetic acid. The overall reactions are as follows:

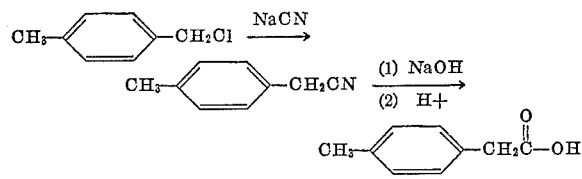

The product of hydrolysis was identified as p-tolyl acetic acid, M.P.=86.5° to 87.5° C. (literature M.P.=91° C.); neutralization equivalent (N.E.)=153 (calculated N.E.=150).

The product of the reaction between p-quinodimethane and hydrogen chloride was thereby identified as p-xylyl chloride.

*Example 12*

This example illustrates the preparation of p-xylylene dithiocyanate from p-quinodimethane.

Fresh lead thiocyanate was prepared by reacting lead nitrate and sodium thiocyanate in aqueous solution according to the equation:

$$Pb(NO_3)_2 + 2NaSCN \rightarrow 2NaNO_3 + Pb(SCN)_2$$

To 80 gms. of $Pb(SCN)_2$ suspended in 500 cc. of anhydrous ether, there were added 40 gms. of $Br_2$ (13 cc.) to bring about the following reaction:

$$Pb(SCN)_2 + Br_2 \rightarrow PbBr_2 + (SCN)_2$$

The insoluble lead bromide was removed from the ether solution by filtration. The ether solution containing thiocyanogen was then chilled to −80° C., and added with vigorous stirring to a glass flask containing 1 liter of hexane containing 0.07 mole of dissolved p-quinodimethane which also had been cooled to a temperature of −80° C. A white precipitate formed almost instantly. Upon warming the solution to room temperature (about 20° C.) the solution became an orange yellow. The insoluble material was removed by filtration and extracted with hot hexane to yield 6 gms. of light orange crystals melting at 128°–131° C. and identified as p-xylylene thiocyanate. The product was dissolved in acetic acid, decolorized with charcoal and reprecipitated from a 50–50 mixture of acetic acid–$H_2O$ to yield white needles of substantially pure p-xylylene dithiocyanate melting at 132°–134° C. (reported M.P. is 134° C.). The product, upon analysis, for sulfur content was found to contain 28.6 percent sulfur; theoretical sulfur content for

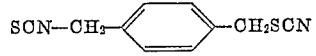

is 29.1 percent. Reduction of the product of this example with lithium aluminum hydride in absolute ether at about 20° C. yielded p-xylylene dimercaptan,

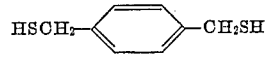

having a melting point of 41°–41.3° C. (reported melting point for the dimercaptan is 46°–47° C.).

p-Xylylene thiocyanate is useful as an insecticide, mothproofing agent, as a lubricating additive in motor oils and hydraulic fluids. It is especially useful as an insecticidal impregnant for woolen goods. Damage to woolen clothing and blankets by cloths moth larvae is substantially reduced and minimized by the use of the product as an impregnant. Furthermore, this composition, because of its highly reactive two thiocyanate substituents, is valuable as a chemical intermediate, for the preparation of mercaptans, high sulfur-containing polymers, and aromatic dyes.

Other new and similarly valuable dithiocyanate derivatives of aromatic compounds are prepared by interacting thiocyanogen with the other quinodimethanes of this invention as described herein.

As is apparent, the present invention relates to the reaction between an inorganic dissociable material selected from the group consisting of the halogens, pseudo-halogens and inorganic acids with an organic compound containing one 6-membered diunsaturated cyclic nucleus to which two methylene groups are doubly bonded, said organic compound having from 0 to 1 aromatically unsaturated six-membered rings fused to the diunsaturated ring. The products thereby produced as the main products of the reaction in accordance with the conditions set forth herein, are 1:1 addition products containing only aromatic unsaturation some of which are known compounds, and others of which are new and useful organic compounds. Various alterations and modifications of the reaction conditions employed may become apparent to those skilled in the art without departing from the scope of this invention.

We claim:

1. A process which comprises pyrolyzing p-xylene at a temperature between about 700° C. and about 1300° C. at a total pressure not higher than about 400 mm. mercury and for a period of not more than about one second, quenching the pyrolyzed vapors in a cold organic liquid to a temperature below about −45° C. to produce a solution of p-quinodimethane, and reacting said p-quinodimethane solution with at least an equimolar amount of an inorganic coreactant selected from the group consisting of the halogens, pseudo-halogens, and inorganic acids to produce an addition product of said p-quinodimethane and inorganic compound.

2. A process which comprises pyrolyzing 1,4-dimethyl naphthalene at a temperature between about 700° C. and about 1300° C. at a total pressure not higher than about 400 mm. mercury and for a period of not more than about one second, quenching the pyrolyzed vapors in a cold organic liquid to a temperature below about −45° C. to produce a solution of 1,4-naphthaquinodimethane, and reacting said 1,4-naphtha-quinodimethane solution with at least an equimolar amount of an inorganic material selected from the group consisting of the halogens, pseudo-halogens, and inorganic acids to produce an addition product of said 1,4-naphthaquinodimethane and inorganic material.

3. A process which comprises pyrolyzing 2-chloro-p- xylene at a temperature between about 700° C. and about 1300° C. at a total pressure not higher than about 400 mm. mercury and for a period of not more than about one second, quenching the pyrolyzed vapors in a cold organic liquid to a temperature below about −45° C. to produce a solution of 2-chloro-p-quinodimethane, and reacting said 2-chloro-p-quinodimethane solution with at least an equimolar amount of an inorganic material selected from the group consisting of the halogens, pseudo-halogens, and inorganic acids to produce an addition product of said 2-chloro-p-quinodimethane and inorganic material.

4. A process which comprises pyrolyzing 2-fluoro-p-xylene at a temperature between about 700° C. and about 1300° C. at a total pressure not higher than about 400 mm. mercury and for a period of not more than about one second, quenching the pyrolyzed vapors in a cold organic liquid to a temperature below about −45° C. to produce a solution of 2-fluoro-p-quinodimethane, and reacting said 2-fluoro-p-quinodimethane solution with at least an equimolar amount of an inorganic material selected from the group consisting of the halogens, pseudo-halogens, and inorganic acids to produce an addition product of said 2-fluoro-p-quinodimethane and inorganic material.

5. A process which comprises pyrolyzing pseudocumene at a temperature between about 700° C. and about 1300° C. at a total pressure not higher than about 400 mm. mercury and for a period of not more than about one second, quenching the pyrolyzed vapors in a cold organic liquid to a temperature below about −45° C. to produce a solution of 2-methyl-p-quinodimethane, and reacting said 2-methyl-p-quinodimethane solution with at least an equimolar amount of an inorganic material selected from the group consisting of the halogens, pseudo-halogens, and inorganic acids to produce an addition product of said 2-methyl-p-quinodimethane and inorganic material.

6. A novel process which comprises reacting p-quinodimethane dissolved in an organic solvent with at least an equimolar amount of chlorine at a temperature below −45° C. in the liquid phase to produce p-xylylene dichloride, and recovering said p-xylylene dichloride as the product of the process.

7. A novel process which comprises reacting p-quinodimethane dissolved in an organic solvent with at least an equimolar amount of bromine at a temperautre below −45° C. in the liquid phase to produce p-xylylene dibromide, and recovering said p-xylylene dibromide as the product of the process.

8. A novel process which comprises reacting 2-methyl-p-quinodimethane dissolved in an organic solvent with at least an equimolar amount of iodine at a temperature below −45° C. in the liquid phase, to produce 2-methyl-p-xylylene diiodide, and recovering said 2-methyl-p-xylylene diiodide as the product of the process.

References Cited in the file of this patent
UNITED STATES PATENTS

| | | |
|---|---|---|
| 2,756,239 | Anderson | July 24, 1956 |
| 2,777,005 | Errede et al. | Jan. 8, 1957 |

OTHER REFERENCES

Huntress: "Organic Chlorine Compounds" (1948), page 894.